Oct. 10, 1933.  W. W. MEYER  1,930,015
AGRICULTURAL MACHINE
Filed Nov. 16, 1931   8 Sheets-Sheet 1
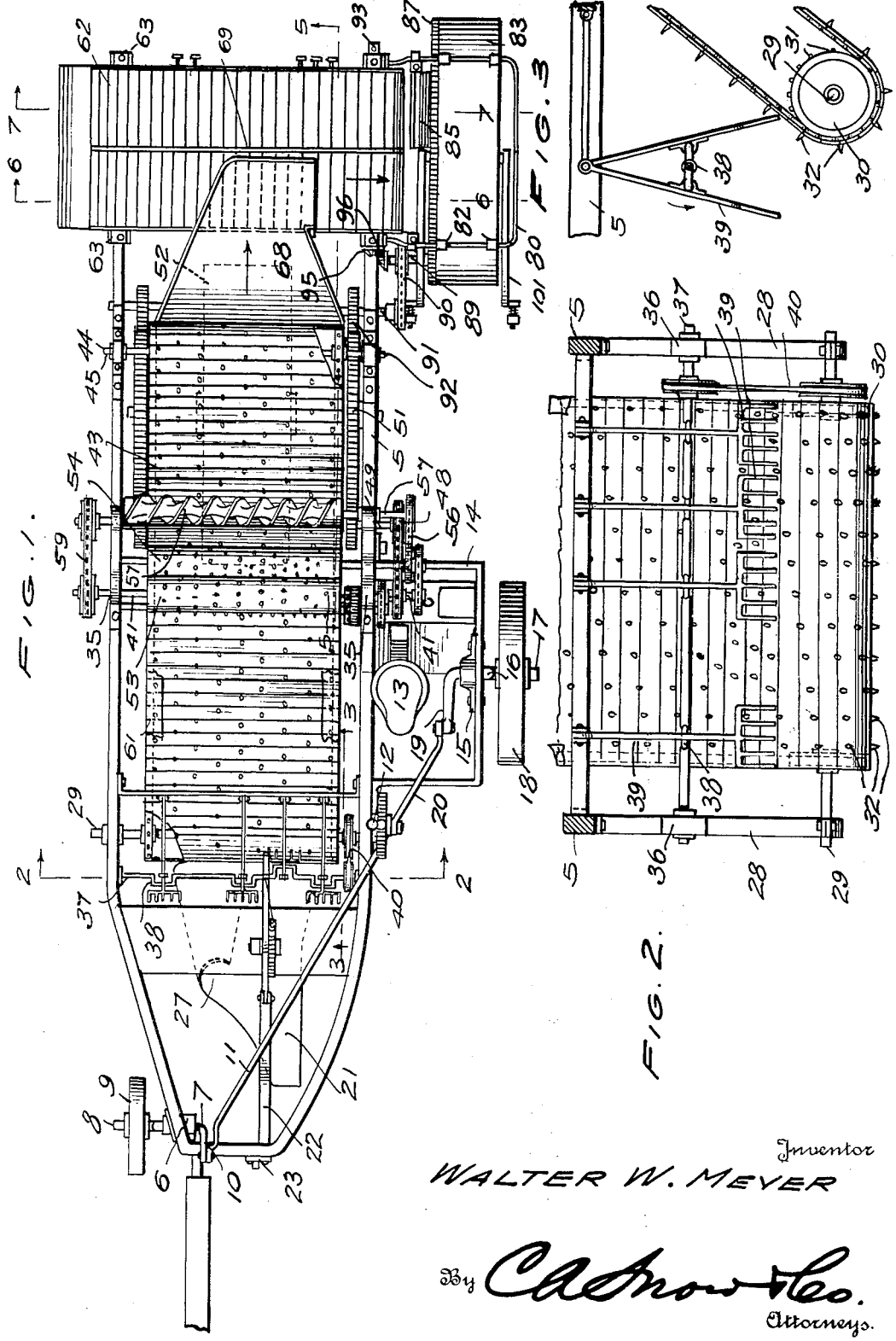
Inventor
WALTER W. MEYER
By C. A. Snow & Co.
Attorneys.

Oct. 10, 1933.     W. W. MEYER     1,930,015
AGRICULTURAL MACHINE
Filed Nov. 16, 1931     8 Sheets-Sheet 2
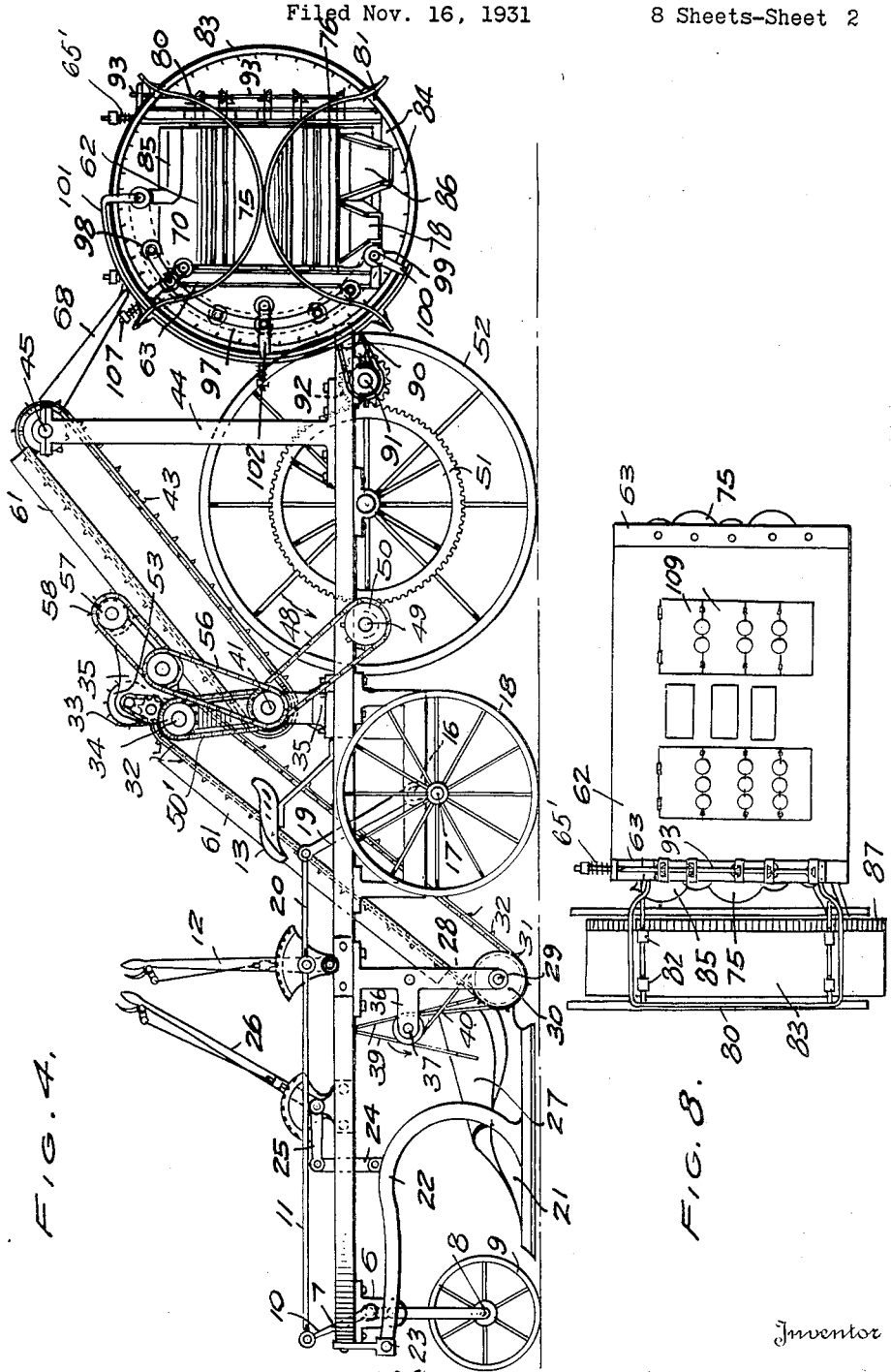
Inventor
WALTER W. MEYER
By C.A.Snow&Co.
Attorneys.

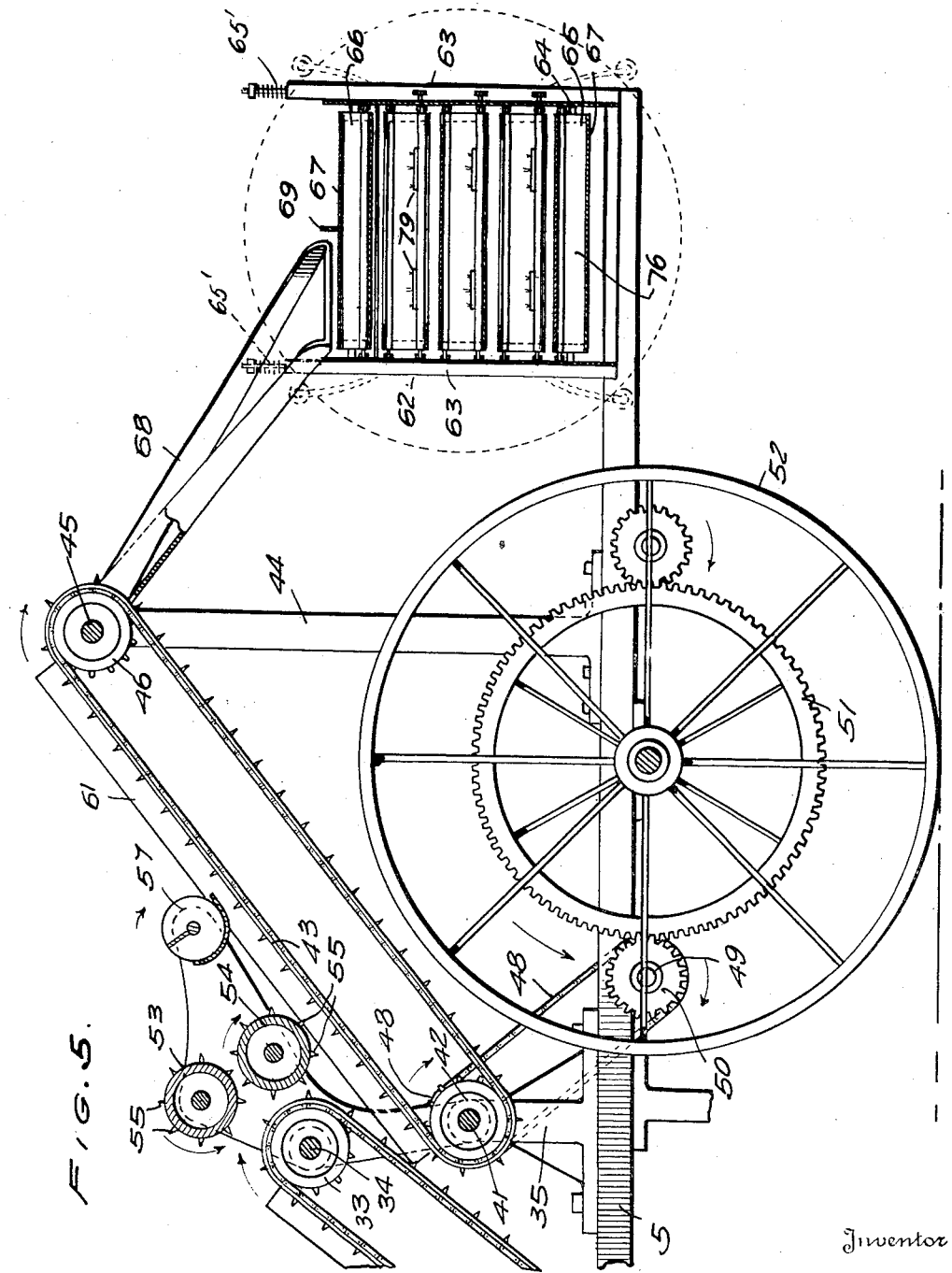

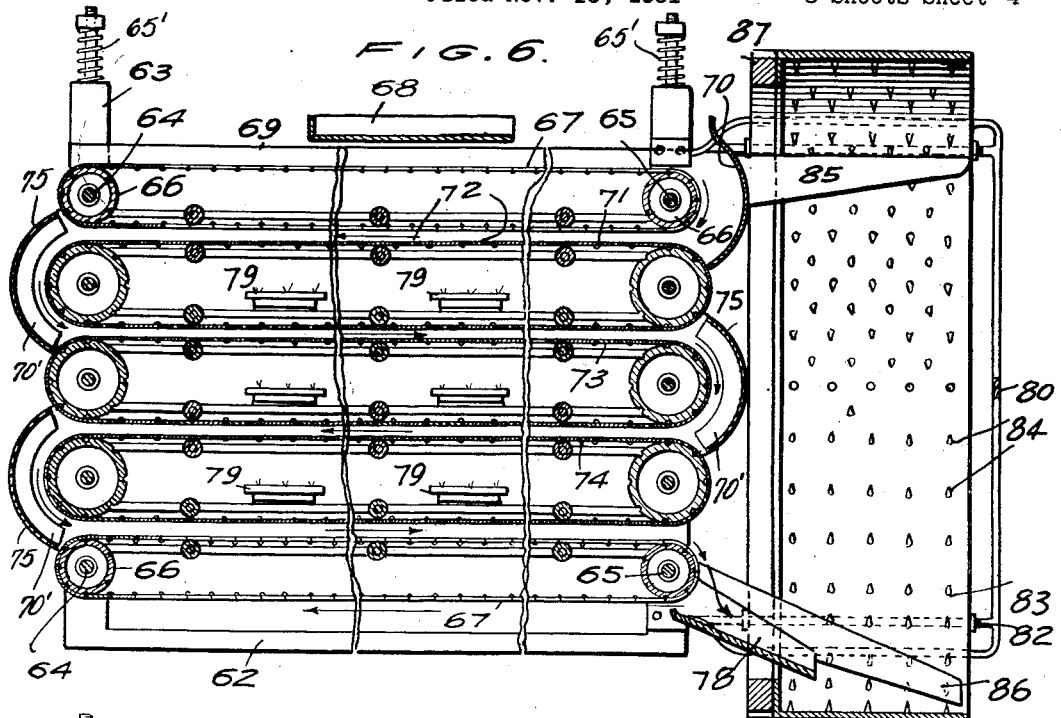
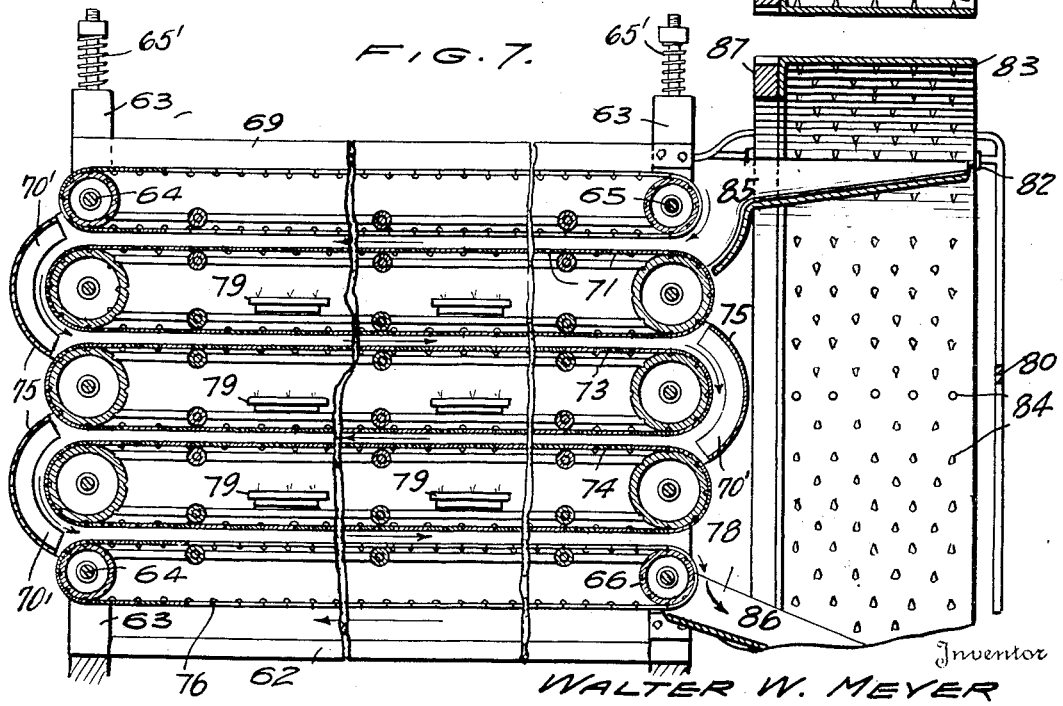

Oct. 10, 1933.    W. W. MEYER    1,930,015
AGRICULTURAL MACHINE
Filed Nov. 16, 1931    8 Sheets-Sheet 5
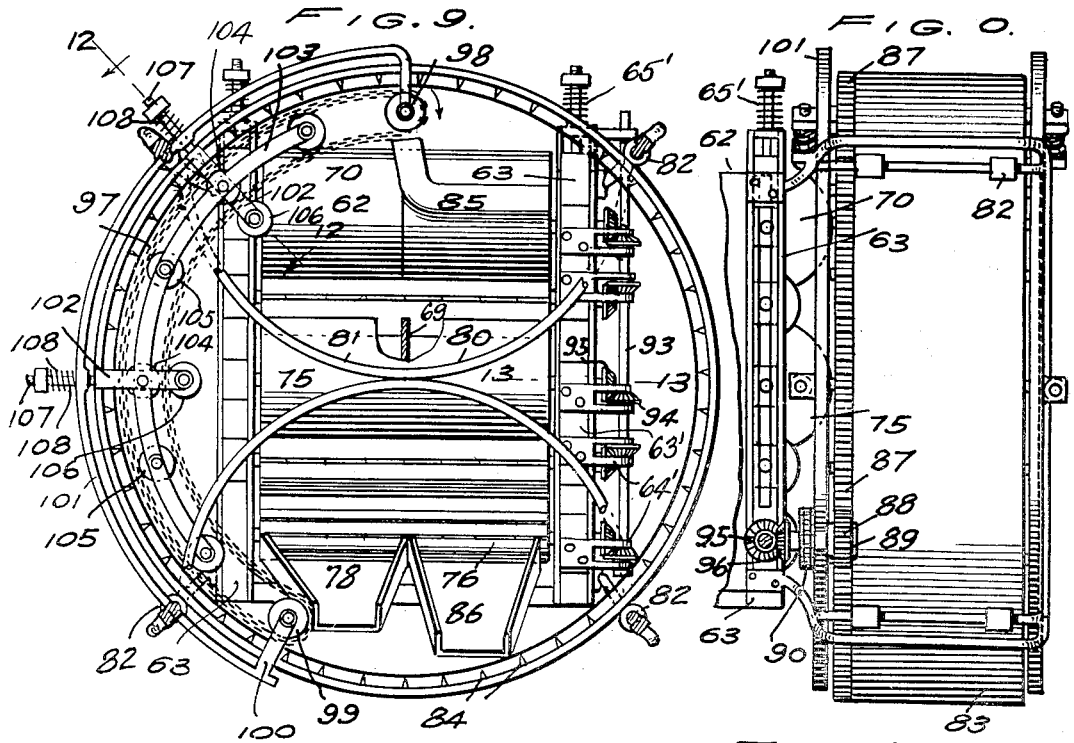
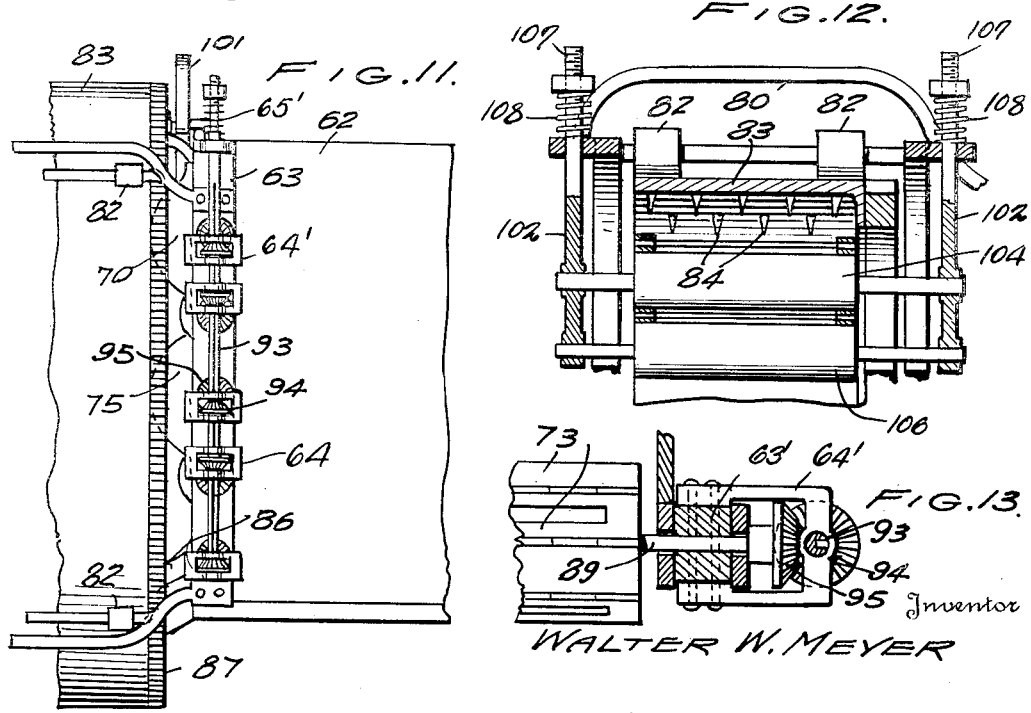
Inventor
WALTER W. MEYER
By C. A. Snow & Co.
Attorneys.

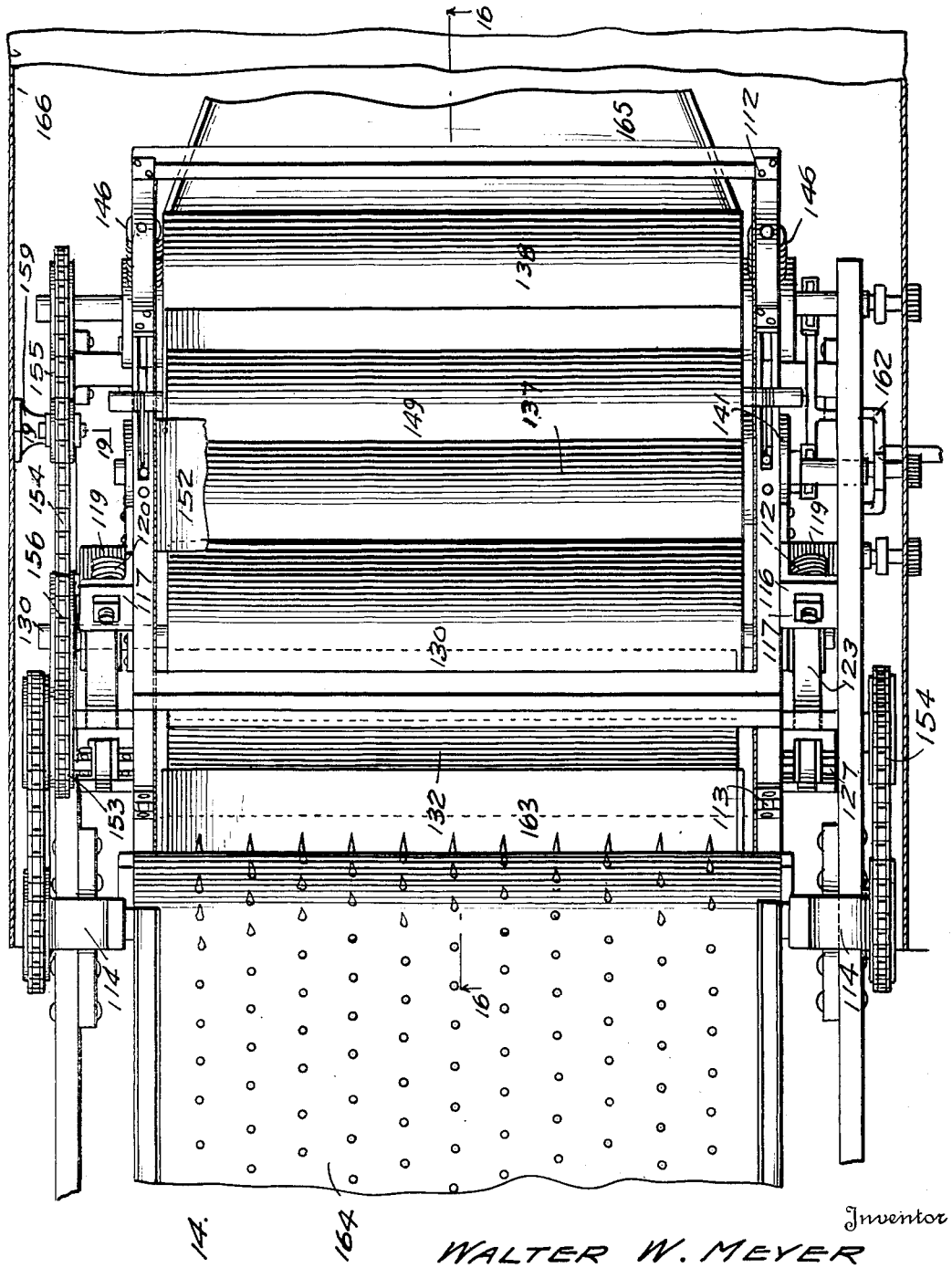

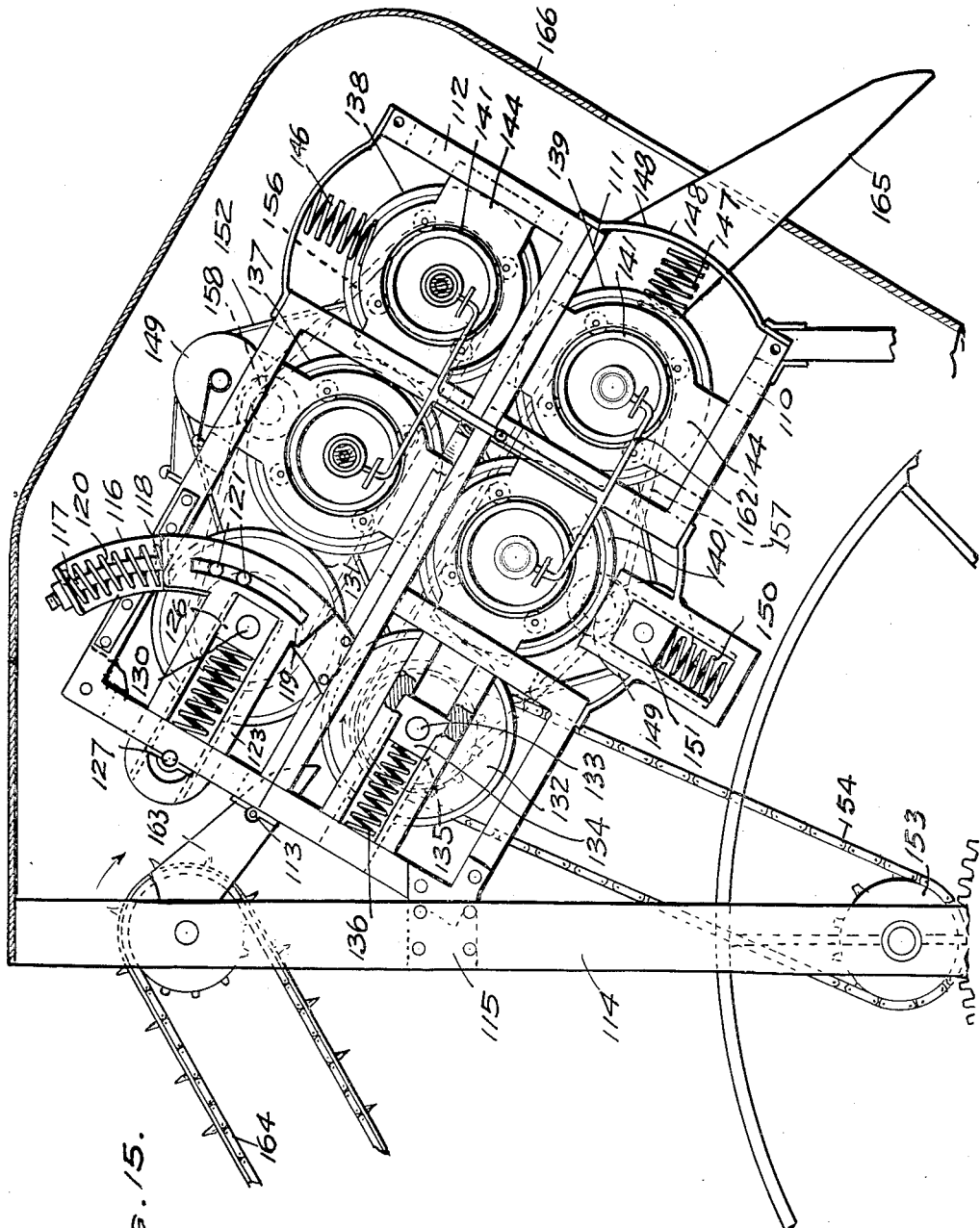

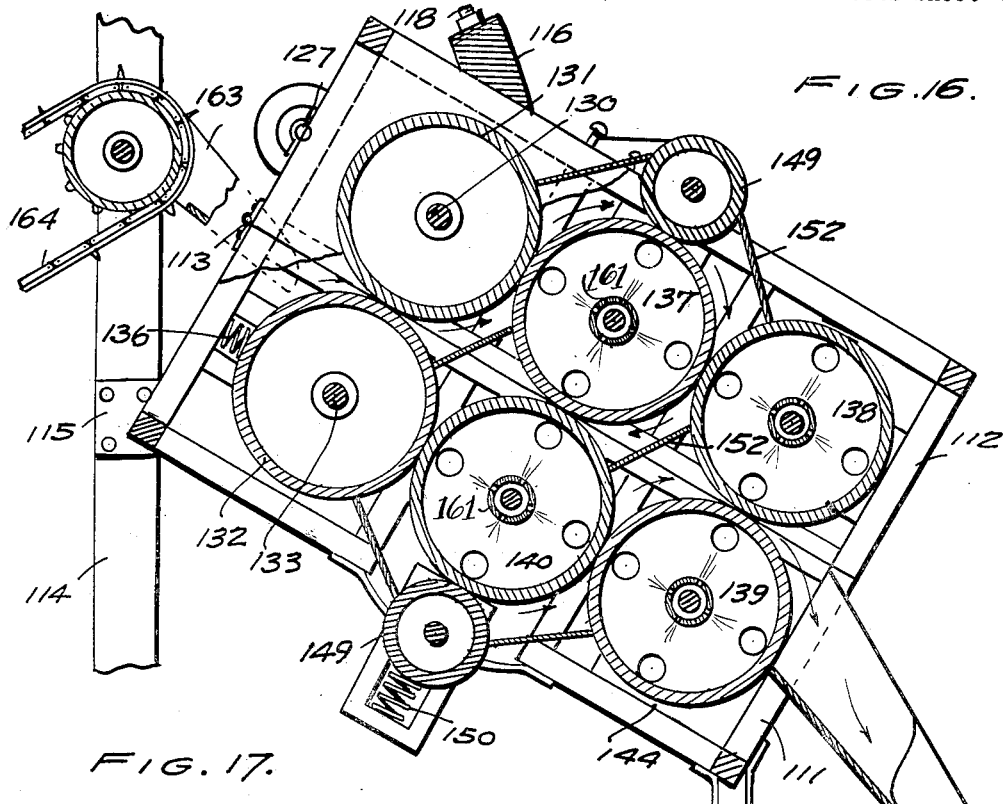
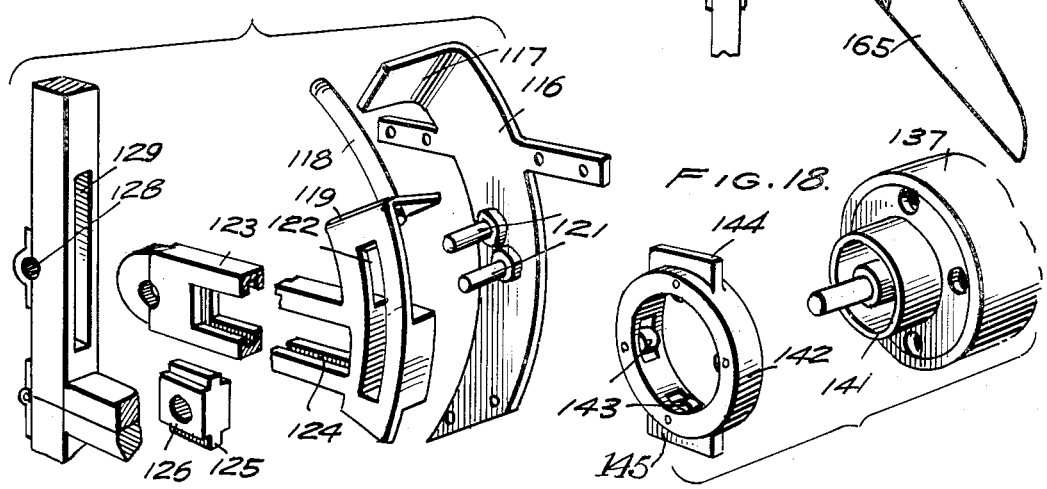
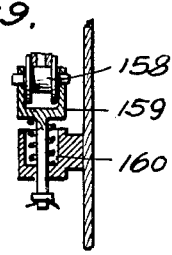

Patented Oct. 10, 1933

1,930,015

UNITED STATES PATENT OFFICE 1,930,015

AGRICULTURAL MACHINE

Walter W. Meyer, Rhinelander, Wis., assignor of one-fourth to Ervin O. Gilmore, Crandon, Wis.

Application November 16, 1931
Serial No. 575,316

5 Claims. (Cl. 97—10)

This invention has reference to agricultural machines, and more particularly to machines designed for use in exterminating noxious vegetation, such as quack grass, yellow dock, loco weeds and the like.

The primary object of the invention is to provide a machine which will break the soil, remove the vegetation from the soil, carry the vegetation to the rear of the machine where the vegetation is treated in such a way as to prevent growth of the vegetation and germination of the seeds that may fall from the vegetation.

Another object of the invention is to provide means for separating stones from the material as it is passed to the rear of the machine, the stone removing means acting to deliver the stones picked up thereby, laterally of the machine where they are deposited on the ground surface.

With the foregoing and other objects in view, which will appear as the description proceeds, the invention resides in the combination and arangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a machine constructed in accordance with the invention.

Figure 2 is a sectional view taken on line 2—2 of Figure 1.

Figure 3 is a sectional view taken on line 3—3 of Figure 1.

Figure 4 is a side elevational view of the machine.

Figure 5 is an enlarged elevational view illustrating the rear end of the machine.

Figure 6 is a sectional view taken on line 6—6 of Figure 1.

Figure 7 is a sectional view taken on line 7—7 of Figure 1.

Figure 8 is a fragmental plan view of the heater used at the rear of the machine.

Figure 9 is a rear elevational view of the heater and carrier ring for carrying the vegetation to a point to deliver the vegetation to the endless conveyors of the heater.

Figure 10 is a side elevational view of the carrier ring.

Figure 11 is a detail view illustrating the gearing for operating the conveyor rollers.

Figure 12 is a sectional view taken on line 12—12 of Figure 2.

Figure 13 is a sectional view taken on line 13—13 of Figure 9.

Figure 14 is an enlarged plan view illustrating a modified form of heater, the cover being shown in section.

Figure 15 is a side elevational view thereof, the cover being shown in section.

Figure 16 is a longitudinal sectional view on line 16—16 of Figure 14 through a modified form of heater.

Figure 17 is a view showing the bearing for the rollers for the modified heater in a disassembled position.

Figure 18 is a disassembled view showing one end of a roller and its bearing.

Figure 19 is a sectional view taken on line 19—19 of Figure 14.

Referring to the drawings in detail, the machine comprises a frame indicated generally by the reference character 5, and as shown the frame comprises side bars, the forward ends thereof converging, providing a narrow front portion.

The reference character 6 designates a bearing disposed at the forward end of the machine in which the shaft 7 is mounted, the shaft 7 being formed with a downwardly and laterally extended end portion 8 providing the axle for the front wheel 9 of the machine.

One end of the shaft 7 extends upwardly as at 10 providing a crank to which the rod 11 is connected, the rod 11 being also connected with the lever 12 disposed near the operator's seat, indicated at 13.

Secured to one side of the frame 5, is a frame 14 which is supplied with a bearing 15 in which the shaft 16 is mounted, the shaft having a downwardly and laterally extended portion providing an axle 17 for the wheel 18.

The inner end of the shaft 16 extends upwardly as at 19 providing a crank arm to which the rod 20 is connected, the rod 20 being also connected with the lever 12 so that movement of the lever will result in a relative movement of the wheels 9 and 18, to raise or lower the front end of the machine, to better adapt the machine for its work.

Carried at the forward end of the machine, is a plow 21, mounted at the lower end of the plow beam 22 which is pivotally supported at the front end of the frame, at 23.

Pivotally connected with the beam 22 is a link 24 that has connection with the arm 25 formed at the lower end of the lever 26, with the result that the operator seated on the seat 13, may adjust the plow 21 vertically to regulate the depth of operation of the plow 21.

The plow 21 is of a novel construction, and as shown the mold board is turned downwardly at 27 to prevent the furrow from turning over and at the same time provide a slide over which the soil may pass to the endless conveyors of the machine, to be hereinafter more fully described.

Extending downwardly from the frame of the machine, near the front thereof, are arms 28, which arms are formed with bearings at their lower ends to receive the ends of the shaft 29 on which the disks 30 are mounted, the disks 30 being provided with pins or teeth 31 to engage the openings formed along the side edges of the endless conveyor 32, which is constructed of a plurality of pivotally connected plates.

The endless conveyor 32 also passes over disks 33 mounted on the shaft 34 which in turn has its ends positioned in bearings formed in the upstanding bearing arms 35, which are bolted to the upper surface of the side bars of the frame 5, at a point substantially intermediate the ends of the frame.

Thus it will be seen that the conveyor 32 operates in an inclined plane and is designed to carry material upwardly to a second conveyor, to be hereinafter more fully described.

Teeth are formed on the conveyor 32 and pick up the material dislodged by the plow, to carry the material upwardly.

Extending forwardly from the arms 28, are arms 36 that have bearings in which the shaft 37 is positioned, the shaft 37 being formed with offset portions providing cranks 38 that connect with the forks 39, which forks operate to separate the vegetation from the soil and deposit the same on the endless conveyor 32.

Power is transmitted from the shaft 29, to the shaft 37, through the belt 40, which is shown as operating over pulleys at the ends of the shafts.

Mounted in bearings formed in the bearing arms 35, is a shaft 41, which is provided with disks 42 disposed at its ends, which disks are provided with teeth that engage within openings formed along the side edges of the endless conveyor 43, the endless conveyor having its forward end disposed in a position under the rear end of the endless conveyor 32, so that material dropping from the conveyor 32 will be picked up by the conveyor 43 and carried through the machine.

Posts 44 are bolted to the frame near the inner end thereof, and extend appreciable distances above the frame where they are provided with bearings to receive the ends of the shaft 45 having disks 46 provided with pins that also engage within the openings at the sides of the endless conveyor 43.

A sprocket is mounted on each end of the shaft 41 and is designed to receive the chains 48 which also move over a sprocket mounted on the shaft 49, to transmit movement of the shaft 49 to the shaft 41 to operate the endless conveyor.

Pinions indicated by the reference character 50 are mounted on one end of the shaft 49, and engage the ring gears 51 which are secured to the opposite sides of the main or supporting wheel 52.

Rolls 53 and 54 are mounted on the bearing arms 35, at a point above the upper end of the endless conveyor 32; the rolls 53 and 54 being formed with spikes 55, to pick up material from the endless conveyor 32, and carry it forwardly depositing the material on the endless conveyor 43, which in turn carries the material to the stove or heater at the rear of the machine.

Movement is transmitted from the shaft 41 to the shaft on which the roll 54 is mounted, through the chain 56 operating over sprockets at the ends of the shafts.

A worm conveyor indicated at 57 operates transversely of the machine and is provided to pick up rocks or stones which may pass between the rolls 53 and 54, to deliver the stones laterally of the machine before they reach the conveyor 43.

Movement is transmitted to the shaft of the worm conveyor 57, through the chain 58. Rotary movement is transmitted from the shaft of the worm conveyor 57, to the shaft of the roll 53, through the chain 59.

The endless conveyor 32 is rotated by means of the disks 33 mounted on the shaft 34, as before stated; the shaft 34 being operated by means of the chain 50', which operates over a sprocket mounted on the shaft 41.

Guard strips indicated by the reference character 61 extend along the side edges of the endless conveyors, and prevent the material carried through the machine by the endless conveyors, from passing laterally from the machine.

Mounted at the rear end of the machine is a heater indicated generally by the reference character 62, the heater embodying a frame including vertical guide bars 63 that provide supports for the vertically movable bearing blocks 63' in which the shafts of the endless conveyor operate.

Frames 64' are secured to the bearing blocks 63' and move upwardly with the bearing blocks under the pressure of the material passing between the conveyors, and moving downwardly under the action of the springs 65' mounted at the upper end of the end bars 63.

Shafts 64 and 65 on which rolls 66 are mounted, provide supports for the endless conveyor 67 which is made up of a plurality of pivotally connected sections of sheet metal material. A chute or trough indicated by the reference character 68 delivers the material from the endless conveyor 43 onto the endless conveyor 67.

Disposed above the uppermost endless conveyor 67, is a longitudinally disposed dividing rib 69 arranged intermediate the side edges of the endless conveyor 67 so that the material delivered onto the uppermost endless conveyor 67 is confined to one side of the endless conveyor.

A curved guard plate 70 is disposed near one end of the endless conveyor 67 and is so arranged that material deposited on the endless conveyor 67 will be carried to one end of the endless conveyor where it will contact with the curved guard plate 70, directing the material to the conveyor 71 operating directly under the lower side of the conveyor 67 in spaced relation therewith.

This conveyor 71 is also constructed of a plurality of pivotally connected sheet metal sections, the sheet metal sections being formed with slots 72, to permit heat to pass upwardly through the endless conveyor, to contact with the weeds, or vegetation moving between the conveyors, to burn the vegetation to a state to insure against the germination of the plants when they have been deposited on the ground surface by the machine.

Disposed directly under the endless conveyor 71, is an endless conveyor 73, and disposed directly under the endless conveyor 73 is an endless conveyor 74. The conveyors 71, 73 and 74 are identical in construction and operate approximately the same distances apart.

Guide plates 75 similar to the guide plates 70, are mounted at the ends of the endless conveyors, to direct material from one conveyor to the other conveyor.

Disposed directly below the conveyor 74, is an endless conveyor 76 that operates over the shafts 77, the endless conveyor 76 being provided to direct the material into the chute 78 at the bottom of the machine.

It might be further stated that each guard plate is provided with a dividing member 70' disposed intermediate its ends to the end that material fed to the uppermost conveyor, is confined to one side of the conveyor and when this material leaves one conveyor, it is directed to one side of the adjacent lower conveyor and carried through the machine.

Fuel burners indicated by the reference character 79 are disposed between the upper and lower sides of certain of the conveyors to generate the heat to scorch or burn the vegetation deposited on the conveyor.

The reference character 80 designates a frame mounted at one side of the main frame 5, the frame embodying pairs of arms 81 that have inwardly extended end portions supplied with rollers 82 within which the conveyor 83 is mounted, the conveyor being in the form of a wide cylinder provided with teeth or spikes 84.

As material is fed into the conveyor 83, it is carried upwardly where the material is dropped into the chute 85 which is substantially wide, and so constructed that material fed into the chute will be delivered into the endless conveyor 67, to the opposite side of the dividing rib 69, returning the material to a position where it will be carried through the stove or heater to further destroy the plant life.

As the material passes from the lowermost conveyor 76, the material passes into the substantially long chute 86, which is of a length to deposit the material in rows at one side of the machine.

The conveyor 83 is provided with a ring gear 87, that is in mesh with the pinion 88 carried at one end of the shaft 89, the shaft 89 being supplied with a sprocket over which the chain 90 operates, which chain also operates over a sprocket mounted on one end of the shaft 91, which in turn is rotated by means of the pinions 92 that are in mesh with the ring gears 51.

As clearly shown by figure 9 of the drawings, the shaft 93 is provided with beveled pinions 94 which are splined on the shaft and arranged in opposite directions, which pinions mesh with pinions 95 carried by the shafts on which the endless conveyors 67, 71, 73, 74, and 76 operate, the shaft 93 receiving its motion through the pinions 95 carried at one end of the shaft 93, and the pinion 96, carried on the inner end of the shaft 89. The pinions 94 are mounted in cut out portions formed in the frames 64' to move vertically therewith.

In order that the material will be held within the conveyor 83 until the material has reached the uppermost point of the conveyor, an endless conveyor 97 is provided. This conveyor operates over the rollers 98 and 99 which are mounted on the arms 100 that extend inwardly from the curved supporting arms 101.

These curved supporting arms provide supports for the arms 102 that in turn support the curved bars 103 on which the rollers 104 are mounted.

The endless conveyor 97 operates over the idle rollers 105, there being provided rollers 106 cooperating with certain of the rollers 105, to hold the endless conveyor 97 in position.

Thus it will be seen that material will be held into close engagement with the conveyor 83, until it passes to a position where it will be deposited in the chute 85.

Shafts 107 extend from the arms 102, and pass through the curved arms 101, where they are supplied with springs 108.

These springs permit of movement of the curved bars 103 towards and away from the conveyor 83, to compensate for various quantities of material passed through the machine, and at the same time exert a pressure on the material to hold the material into close engagement with the conveyor 83.

It will of course be understood that the furnace or heater 62 is encased in a suitable casing as clearly shown by Figure 8 of the drawings, the casing having doors such as indicated at 109, to permit of access to the interior.

In the modified form of the invention as shown by sheets 6, 7 and 8 of the drawings, the heater includes a frame indicated generally by the reference character 110, the frame comprising a lower section 111, and an upper section 112, the upper section being pivotally connected with the lower section 111, by means of the hinges 113.

The frame 110 is connected to the bars 114 that rise from the frame of the machine, the frame 110 being connected by means of the plates 115.

Mounted within the upper section 112, are arcuate shaped bearing members 116 that are provided with laterally extended apertured end portions 117 through which the curved rods 118 pass, the curved rods 118 being carried by the movable bearings 119, there being provided coiled springs 120 mounted on the rods 118 and bearing against the end portions 117, to urge the movable bearings 119, to their normal positions.

Pins 121 extend from the bearing member 116, and operate in the elongated openings 122 of the bearings 119, the pins operating to guide the bearings during their movements.

The bearings 119 also embody inwardly extended spaced arms 123 that have their inner surface curved as at 124 to accommodate the ribs 125 of the bearing blocks 126, so that the bearings may move longitudinally of the arms 123, for purposes to be hereinafter more fully described.

At the inner ends of the arms 123, are openings to accommodate the pivot pins 127 that also fit within the openings 128 of the end bars of the upper section of the frame.

Elongated openings 129 are formed in the end bars of the upper section of the frame, and accommodate the inwardly extended spaced arms 123, the openings 129 being of lengths to permit the arms 123 to swing vertically.

The bearing blocks 126 accommodate the ends of the shaft 130 on which the roll 131 is mounted. Disposed adjacent to the roll 131, is a roll 132 that cooperates with the roll 131 in feeding material into the frame.

The roll 132 is mounted on the shaft 133, which is journaled in the bearings 134 that slide in the grooves of the spaced bearing arms 135. Coiled springs 136 bear against the bearing blocks 134 and normally urge the roll 132 towards the opposite end of the frame. These rolls 131 and 132, constitute the feed rolls for the modified form of the invention. The heating rolls are indicated by the reference characters 137, 138, 139 and 140, which rolls are provided with bearings 141 which are in the form of collars, the collars being fitted within the bearing rings 142 that are provided with rollers 143 to engage the bearings 141.

Thus it will be seen that due to this construction, the rolls are rotated freely.

Ribs 144 and 145 extend from the rings 142, the ribs of the rings 142 over which the rolls 137 and 139 are mounted, being disposed vertically and operating in grooves formed in the upper and lower bars of the frame sections, so that the rolls 137 and 139 may move longitudinally of the frame 110, while the rings 142 in which the rolls 138 and 140 are mounted, operate in vertical grooves formed in vertical bars of the frame as clearly shown by Figure 15 of the drawings.

Coiled springs 146 cooperate with the bearing rings 142 in which the roll 138 moves, to normally urge the bearing rings downwardly to force the roll 138 into cooperative relation with the roll 139.

A coiled spring indicated at 147 is mounted between the bars 148 of the frame, and the bearing members in which the roll 139 is mounted, to normally urge the bearing members towards the inner end of the frame and into contact with the roll 140.

Upper and lower pressure rolls 149 are mounted in the frame 110, at points intermediate the ends thereof, and exert pressure on the rolls 137 and 140, to normally urge the roll 140 against the roll 137.

The lower roll 149 is urged upwardly by means of the spring 150 that acts against the bearing block 151 of the roll 149. Guide plates 152 are disposed between the rolls, and act to direct material in the direction of the arrows as indicated in Figure 16, to the end that as the rolls are rotated, the material will be fed over the hot rolls, to kill the plant life to prevent growth of the vegetation.

Rotary movement is transmitted to the several rolls, through the medium of the sprockets 153 over which the chains 154 operate, the chains also operating over sprockets 155 mounted on the shaft 133. Movement of the shaft 133 is transmitted to the remaining rolls of the heater, through the medium of the chains 156 and 157. The chain 156 operates over the pulley 158 that is mounted in the bearing 159. This bearing 159 is seated on the coiled spring 160 to the end that the bearing 159 may move vertically under the weight of the chain.

Gas pipes 161 extend into the heating rolls, and are supplied with gas from a suitable source of supply, through the pipes 162, to the end that the heating rolls are heated to the proper temperature.

Material is fed into the chute 163 by means of the endless conveyor 164 from where the material passes between the rolls in the manner as described, the material being discharged into the chute 165.

The cover for the heater is indicated at 166, and may be of any desired construction.

Having thus described the invention what is claimed is:

I claim:

1. The combination with an agricultural machine having conveyors for conveying material from the machine, of a heater embodying a plurality of endless conveyors comprising pivotally connected metallic sections, burners disposed between the conveyors, and said metallic sections having slits to allow heat from the burners to pass therethrough and burn material on the endless conveyors.

2. The combination with an agricultural machine having conveyors for conveying material therethrough, of a heater including a plurality of superposed metallic conveyors formed with slits, a dividing rib disposed longitudinally of the uppermost conveyor, means for heating the metallic conveyors to scorch material deposited thereon, and means for delivering material to and from the conveyors.

3. The combination with an agricultural machine having conveyors for conveying material through the machine, of a heater including a plurality of metallic conveyors formed with openings, means mounted within the metallic conveyors for directing heat through the openings to scorch material deposited on the conveyors, and a rotary member for receiving scorched material from the conveyors, and means for further treating the material, after the material has passed through the rotary member.

4. The combination with an agricultural machine having conveyors for conveying material towards the rear of the machine, of a heater mounted at the rear of the machine, said heater embodying endless metallic conveyors arranged one above the other, means on the conveyors for dividing the conveyors into lateral passageways, means for heating the conveyors to scorch material deposited thereon, and a rotary member associated with the endless conveyors for receiving material therefrom and further treating material.

5. The combination with an agricultural machine having a plurality of inclined conveyors for carrying material upwardly towards the rear of the machine, of a heater mounted at the rear of the machine, a trough for delivering material from the conveyors to the heater, said heater embodying a plurality of endless metallic belts, means for retaining material in the heater for a predetermined period, and means disposed adjacent to the heater for receiving material from the heater and further treating the material.

WALTER W. MEYER.